(12) United States Patent
Kolesnikov

(10) Patent No.: US 9,124,417 B2
(45) Date of Patent: Sep. 1, 2015

(54) COMPUTATION OF GARBLED TABLES IN GARBLED CIRCUIT

(75) Inventor: Vladimir Y. Kolesnikov, Jersey City, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 861 days.

(21) Appl. No.: 12/660,900

(22) Filed: Mar. 5, 2010

(65) Prior Publication Data
US 2011/0216902 A1    Sep. 8, 2011

(51) Int. Cl.
H04L 9/06 (2006.01)
H04L 9/14 (2006.01)
H04L 9/28 (2006.01)

(52) U.S. Cl.
CPC .. *H04L 9/06* (2013.01); *H04L 9/14* (2013.01); *H04L 9/28* (2013.01)

(58) Field of Classification Search
CPC .................................... H04L 9/28; H04L 9/06
USPC ................................................ 380/28, 44, 47
See application file for complete search history.

(56) References Cited

U.S. PATENT DOCUMENTS

| | | | | |
|---|---|---|---|---|
| 6,128,386 | A * | 10/2000 | Satterfield | 380/28 |
| 6,834,272 | B1 * | 12/2004 | Naor et al. | 705/80 |
| 7,240,198 | B1 * | 7/2007 | Pinkas et al. | 713/168 |
| 7,974,405 | B2 * | 7/2011 | Furukawa et al. | 380/28 |
| 2005/0195975 | A1 * | 9/2005 | Kawakita | 380/30 |
| 2009/0175443 | A1 * | 7/2009 | Kolesnikov et al. | 380/44 |
| 2010/0306543 | A1 * | 12/2010 | Kolesnikov | 713/171 |
| 2011/0110525 | A1 * | 5/2011 | Gentry | 380/285 |
| 2011/0211692 | A1 * | 9/2011 | Raykova et al. | 380/46 |
| 2011/0216902 | A1 * | 9/2011 | Kolesnikov | 380/47 |

OTHER PUBLICATIONS

Lindell et al., "A Proof of Security of Yao's Protocol for Two-Party Computation", Journal of Cryptology, pp. 161-188, Jun. 26, 2009.*
Wilko et al, TASTY: tool for automating secure two-party computations, Proceedings of the 17th ACM conference on Computer and communications security, 2010, pp. 451-462.*
Riccardo et al, Division between encrypted integers by means of Garbled Circuits, IEEE, 2011, pp. 1-6.*

* cited by examiner

*Primary Examiner* — Christopher Brown
*Assistant Examiner* — Ali Shayanfar
(74) *Attorney, Agent, or Firm* — Patti & Malvone Law Group, LLC

(57) ABSTRACT

An efficient encryption system for improving the computation speed of a garbled circuit is set forth. The garbled circuit includes a number of garbled Boolean gates having first and second garbled Boolean gate input wires. The system includes a first key ki on a first garbled gate input wire. A second key kj is also provided on a second garbled gate input wire. A programmable function is provided for combining the first key ki and the second key kj to obtain an encrypted output key. A method for expediting encryption and decryption of a garbled circuit having a number of encryptions for a garbled table of a garbled gate is also set forth. The method includes the steps of: forming the garbled table with a number of secret keys by applying a function to the secret keys to produce less than twice the number of secret keys as the number of encryptions for the garbled table, and evaluating the garbled table to decrypt an output key of the garbled table.

14 Claims, 4 Drawing Sheets

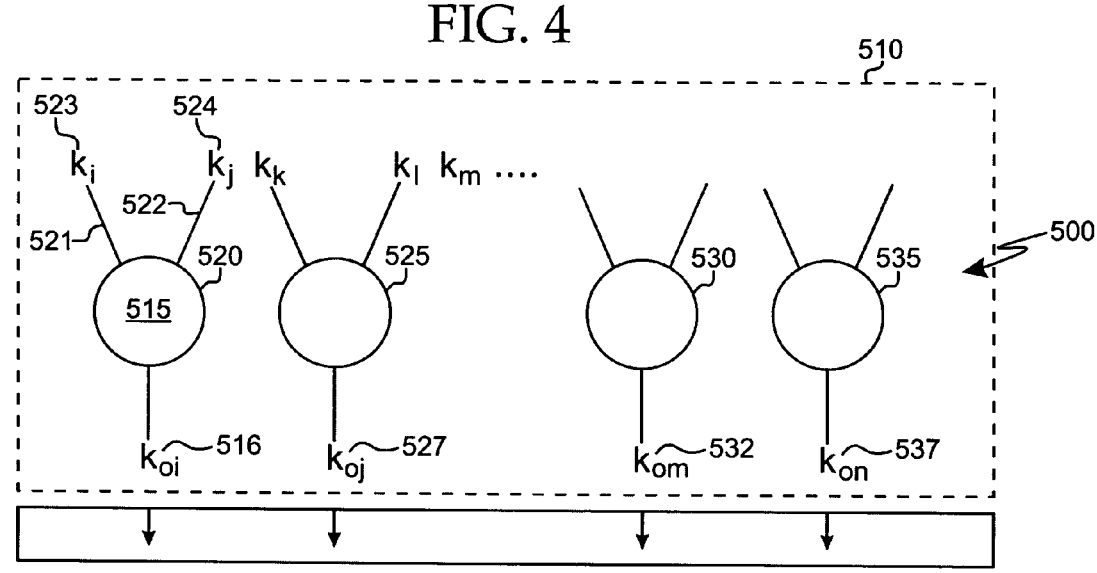
FIG. 4
FIG. 5
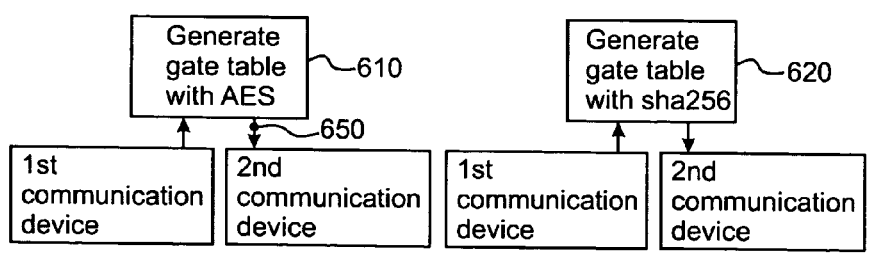
FIG. 6

COMPUTATION OF GARBLED TABLES IN GARBLED CIRCUIT

BACKGROUND

In the early days of network security development, Bell Labs developed a system they dubbed Greyer, a model based loosely on the Blacker Front End$_{[BFE, Mund87]}$ but which was much less secure. Greyer could be employed for both providing end-to-end encryption between a pair of hosts communicating over an insecure network, and for providing network-level encryption between a pair of gateways, each of which is protecting a group of naive hosts.

Many improvements in both networks and encryption of network communications have been developed since the introduction of Greyer. Modern day network cryptography involves improving security and efficiency while reducing computation costs. Concepts suitable for stronger assumption algorithms often differ from, and cannot be translated to weaker assumption algorithms, which are more secure encryption systems. The development of encryption models for private communications on public networks has been an area of great interest and development, as the need to provide readily accessible secure communication and transactions has grown tremendously due to improvements in communication channels.

Specifically, two-party general secure function evaluation (SFE) enables two parties to evaluate any function on their respective inputs x and y, while maintaining privacy of both x and y. Efficient SFE algorithms are suitable for performing a variety of electronic transactions, previously impossible due to mutual mistrust of participants. SFE is useful for transactions such as, for example, auctions, contract signing, distributed database mining, etc. As computation and communication resources have increased dramatically, SFE has become truly practical for securely performing private interactions on public networks.

Currently, there are several existing implementations of full-fledged, generic two-party SFE with malicious players. This clearly demonstrates the feasibility and efficiency of SFE for many useful functions, represented as circuits of up to $\approx 10^6$ gates. Today, generic SFE is a relatively developed technology, and improvements that reduce costs, improve efficiency, and/or improve security by even incremental factors are welcomed among cryptographers and engineers.

General SFE has been a subject of immense amount of research. The work of Andrew C. Yao. in "Protocols for secure computations", *Proc. 23rd IEEE Symp. on Foundations of Comp. Science*, pages 160-164, Chicago, 1982. IEEE.), for example, has resulted in significant advances in the field. Further, an example of a full practical implementation of general SFE based on garbled circuits is discussed, for example, by Lindell et al. in "Implementing Two-Party Computation Efficiently with Security Against Malicious Adversaries", *SCN '08: Proceedings of the 6th international conference on Security and Cryptography for Networks*, pages 2-20. Springer-Verlag, 2008.

A recent work, Lindell et al. proposes one of the more efficient protocols for providing security with Yao's protocol against malicious adversaries. The encryption proposed by Lindell et al is suitable for use in a Random Oracle Model (ROM) version, a relatively strong assumption.

In the Lindell protocol, a circuit constructor party $P\_1$$P_1$ first assigns random keys $k\_i\hat{\ }j$ in $\{0,1\}^n$$k_i^j \in \{0,1\}^n$ to each wire value. Next, for the $i$$i$-th wire $W\_i$$W_i$, $P\_1$$P_1$ chooses a random permutation $pi\_i$$\pi_i$ of $\{0,1\}$$\{0,1\}$. Wire encoding is then achieved for pair $w\_i\hat{\ }j = (k\_i\hat{\ }j, c\_i\hat{\ }j)$$w_i^j = (k_i^j, c_i^j)$, where $c\_i\hat{\ }j = Pi\_i(j)$$c_i^j = \Pi_i(j)$. For gate $G\_g$$G_g$, the gate table consists of four entries indexed by the values of $c\_i\hat{\ }j$$c_i^j$ and is given by: begin{equation*}

$$c\_1, c\_2 : Enc\_\{k\_1\hat{\ }\{b\_1\}, k\_2\hat{\ }\{b\_2\}\}\hat{\ }\{g\|c\_1\|c\_2\}(k\_3\hat{\ }\{G(b\_1,b\_2)\}\|c\_3),$$

end{equation*}

$$c_1, c_2: Enc_{k_1^{b_1}, k_2^{b_2}}^{g\|c_1\|c_2}(k_3^{G(b_1,b_2)}\|c_3),$$

where $k\_1$$k_1$ and $k\_2$$k_2$ are the keys on the gate's input wires, $k\_3$$k_3$ is the key on the gate output wire, $b\_1 = pi\_1\hat{\ }\{-1\}(c\_1)$, $b\_2 = pi\_2\hat{\ }\{-1\}(c\_2)$$b_1 = \pi_1^{-1}(c_1), b_2 = \pi_2^{-1}(c_2)$, and $c\_3 = pi\_3(G(b\_1,b\_2))$$c_3 = \pi_3(G(b_1,b_2))$. The encryption function $Enc\_\{k\_1,k\_2\}\hat{\ }s(m)$$Enc_{k_1,k_2}^s(m)$ is computed as follows:

1. $k$ leftarrow KDF ($k\_1\|s, |m|$)$k \leftarrow KDF(k_1\|s,|m|)$;
2. $k'$ leftarrow KDF ($k\_2\|s, |m|$)$k' \leftarrow KDF(k_2\|s,|m|)$;
3. $e$ leftarrow m oplus k oplus k'$e \leftarrow m \oplus k \oplus k'$; and
4. return $e$$e$.

Here, KDF (Key Derivation Function) is a pseudorandom function, such as Advanced Encryption Standard (AES) or keyed hash function. Thus, creation of each table entry involves two KDF executions.

Similarly, decryption of a table entry involves an inverse of the above encryption operations:

1. $k \leftarrow KDF(k_1\|s, |e|)$;
2. $k' \leftarrow KDF(k_2\|s, |e|)$;
3. $e \leftarrow m \oplus k \oplus k'$; and
4. return m.

Decryption of the table entry involves two KDF invocations as well.

Although good efficiency is achieved in the ROM version applying the Lindell et al protocol, a double encryption is still required for the Non-ROM, more secure version.

The Lindell protocol does not apply to systems of weaker assumptions. This is due to the fact that one cannot encrypt, e.g., as follows: $e = m \oplus KDF(k_1\|k_2\|s, |m|)$, since part of the key is known to the adversary, security of pseudorandom functions cannot be analyzed. For example, in Garbled Circuit (GC) evaluation, the evaluator $P\_2$$P_2$ will know $k\_1$$k_1$ and $k\_2$$k_2$, allowing him to decrypt the corresponding entry in the garbled table. However, two other keys in the garbled table are encrypted in part by $k\_1$$k_1$ or $k\_2$$k_2$. As such, even though they are also encrypted with a key that is partially unpredictable to $P\_2$$P_2$, Pseudo-Random Function Generator (PRFG) properties do not allow the assertion of claims of secrecy of the other encryptions in the garbled table.

Currently what is known for garbled circuits with weaker assumptions is that each entry in the garbled table is an encryption of an encryption of the target value. Each of the two encryptions is under the corresponding wire key. As a result, decryption of the circuit results in two decryption operations for each gate of a given circuit.

SUMMARY OF THE INVENTION

An efficient encryption system for improving the computation speed of a garbled circuit is set forth. The garbled circuit includes a number of garbled Boolean gates having first and second garbled Boolean gate input wires. The system includes a first key ki on a first garbled gate input wire. A second key kj is also provided on a second garbled gate input wire. A programmable function is provided for combining the first key ki and the second key kj to obtain an encrypted output key.

A method for expediting encryption and decryption of a garbled circuit having a number of encryptions for a garbled table of a garbled gate is also set forth. The method includes the steps of forming the garbled table with a number of secret keys by applying a function to the secret keys to produce less than twice the number of secret keys as the number of encryptions for the garbled table, and evaluating the garbled table to decrypt an output key of the garbled table.

The improvement set forth herein results in expediting the computation related to the evaluation of the garbled circuit by approximately a factor of two. This is particularly relevant for SFE of large circuits, where the computation cost is very significant.

DESCRIPTION OF THE DRAWINGS

FIG. 4 illustrates still another embodiment of a system constructed in accordance with the principles herein.

FIG. 5 illustrates an embodiment of a method constructed in accordance with the principles herein.

FIG. 6 illustrates an alternative embodiment of a method constructed in accordance with the principles herein.

DETAILED DESCRIPTION

In accordance with the principles herein, each gate table entry can be reduced to a single encryption, with the key equal to, for example, the exclusive OR gate (XOR) of the corresponding wire keys. As a result, only one encryption and decryption is required per gate table entry in this case.

Any suitable function for reducing the number of encryptions can be utilized in accordance with the principles herein. For example, the XOR of the keys $k_1$, $k_2$, can be applied such that an encryption algorithm is, for example, $e = m \oplus KDF(k_1 \oplus k_2 \| s, |m|)$. A garbled table can be generated for the exemplary encryption algorithm as follows:

$$T_0 = \begin{cases} t_{00} = Enc_{k_1^0 \oplus k_2^0}(k_0^0) \\ t_{01} = Enc_{k_1^0 \oplus k_2^1}(k_0^0) \\ t_{10} = Enc_{k_1^1 \oplus k_2^0}(k_0^0) \\ t_{11} = Enc_{k_1^1 \oplus k_2^1}(k_0^1) \end{cases}$$

Since the unknown, or random-looking, key will completely mask the known part of the key in the table entries that are supposed to remain hidden, the problem with the partially known keys is avoided in this case. As a result, standard proof of security of the GC is achieved.

Figure 1:
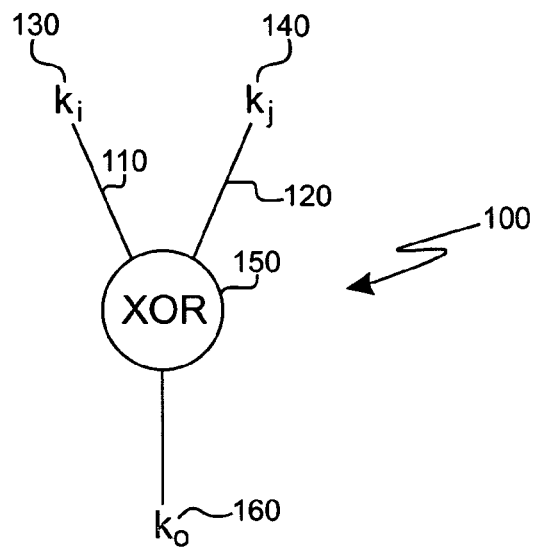
FIG. 1 illustrates an embodiment of a system constructed in accordance with the principles herein.

As illustrated in FIG. 1, an efficient encryption system for improving the computation speed of a garbled circuit shown generally at 100 is set forth. The garbled circuit of the system includes a number of garbled Boolean gates having first and second garbled Boolean gate input wires 110 and 120, respectively. A first key ki 130 is provided on the first garbled gate input wire 110. A second key kj 140 is provided on a second garbled gate input wire 120. A programmable function, such as an XOR function, 150 is provided for combining the first key ki and the second key kj to obtain an encrypted output key ko 160.

In an exemplary embodiment, the programmable function is further defined by PRFG, and the function is further defined by the XOR 150 of the first key ki 130 and the second key kj 140.

In another embodiment, the first and second keys 130, 140, respectively are each 127 bits long, and the programmable function 150 adds the first and second keys 130,140, respectively modulo $2^{127}$.

In yet another embodiment, the programmable function is further defined by AES. The PFRG can be further defined by Secure Hash Algorithm-256 (sha256).

Figure 2:
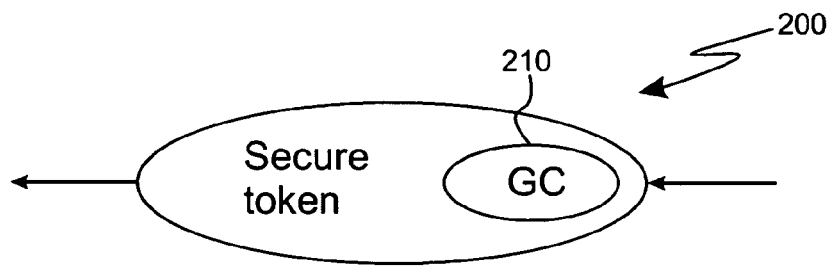
FIG. 2 illustrates another embodiment of a system constructed in accordance with the principles herein.

The system set forth herein is useful in a wide variety of encryption applications. For example, the garbled circuit can be transmitted by a secure token as illustrated generally at 200 in FIG. 2. Here, a garbled circuit 210 includes a number of gate tables and wire encryptions (not shown). Each gate for the number of garbled gates includes a first key ki and a second key kj, wherein the encrypted output key for each garbled gate is selected from the domain of PRFG.

Figure 3:
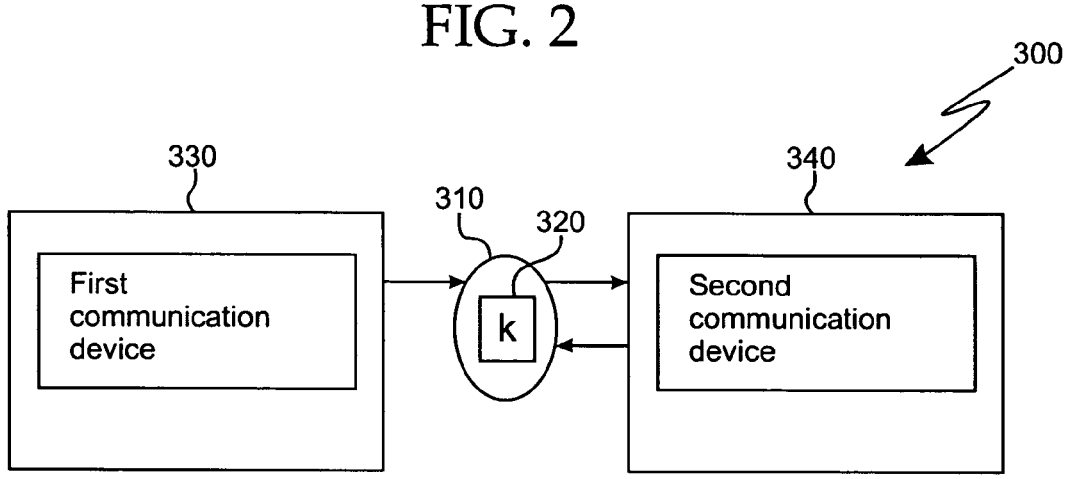
FIG. 3 illustrates yet another embodiment of a system constructed in accordance with the principles herein.

As illustrated in FIG. 3, an embodiment of a system constructed in accordance with the principles herein shown generally at 300 can include, for example, a token 310 that can be used to generate and transmit a circuit 320 from a first network device 330 to a second network device 340.

An exemplary algorithm for encrypting in accordance with the principles here is shown generally at 400 in the embodiment illustrated in FIG. 4, wherein the means for encrypting is further defined by encrypting in accordance with the following:

$$e = m \oplus KDF(k_1 \oplus k_2 \| s, |m|).$$

As illustrated in the Figures, a garbled circuit having a number of garbled gates can be constructed with weak assumptions. To this end, each gate includes a first input wire having a first pair of input keys and a second input wire having a second pair of input keys. A gabled gate forming algorithm, wherein the gate forming algorithm generates four encryptions, one for each key of the first pair of input keys and one for each key of the second pair of input keys is provided. Each encryption of the four encryptions can be further defined by an XOR of the first pair of input keys and the second pair of input keys, respectively, and wherein the gate output key is generated using the gate table forming algorithm.

The gate table forming algorithm can be defined by, for example, AES. The garbled circuit can be transmitted, for example via a secure token As illustrated generally at 500 in FIG. 5, a cost-effective method for generating a garbled circuit is provided. A garbled circuit 510 includes a number of garbled gates 520, 525, 530, 535, etc each having first and second garbled gate input wires. The garbled circuit 510 incorporates encrypted information suitable for transmitting between a first communication device and a second communication device. The method includes the steps of providing a gate having first and second input wires, such as, for example, a first input wire 521 and a second input wire 522, and first and second keys, such as a first key 523 and a second key 524, on the first and second input wires, 521 and 522 respectively, and generating a gate table, such as 517 with a PRFG algorithm, wherein the gate table, such as 517 includes four encryptions with a resulting key, such as key 516, for each encryption equal to a function, such as 515, of the first and second keys 523 and 524, respectively, of the first and second input wires 521, 522. Similarly, other gate tables such as, for example 526, 531, 536 can be generated based on the local values of associated keys 527, 531, and 537.

The step of generating the gate table with a PRFG algorithm can be further defined by generating a gate table using AES, as illustrated at 610 in FIG. 6. Alternatively, the step of generating the gate table with a PRFG algorithm is further defined by generating a gate table using sha256, as illustrated at 620. A further step can include transmitting the garbled circuit from a first communication device 630 to a second communication device 640 using, for example, a secure token 650, as illustrated in FIG. 6.

Figure 7:
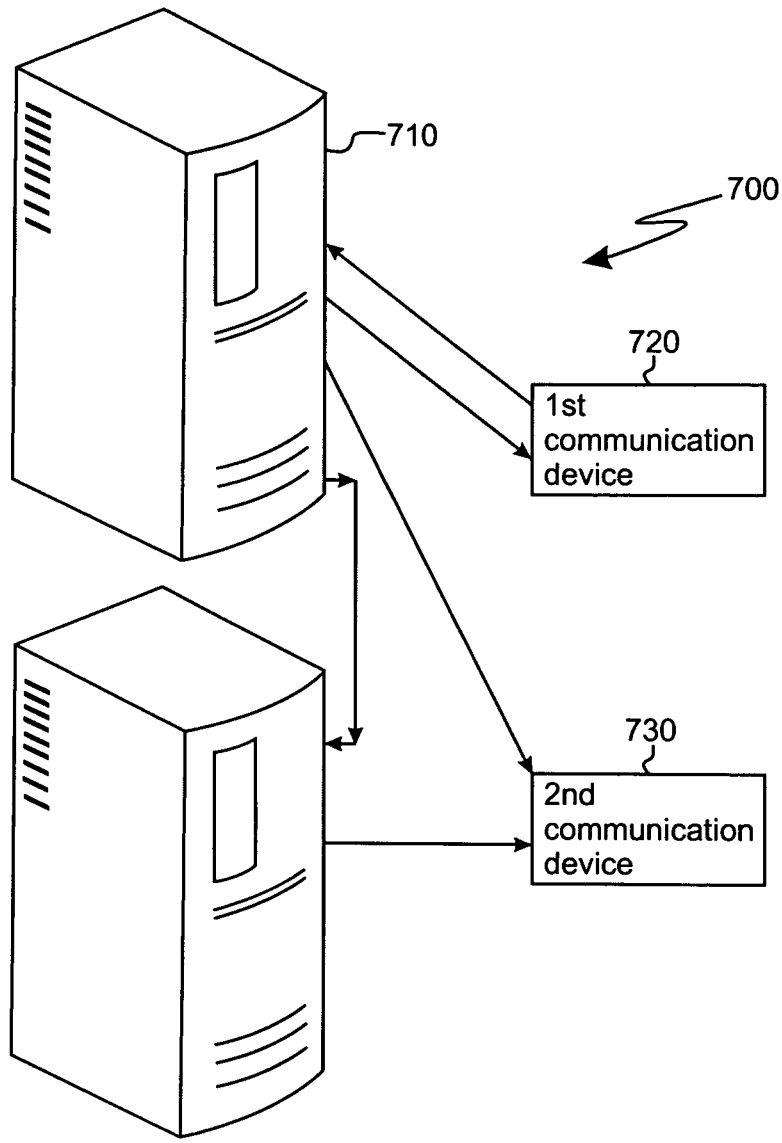
FIG. 7 illustrates still another embodiment of a method constructed in accordance with the principles herein.

In an embodiment of a system illustrated generally at 700 in FIG. 7, a network server 710, adapted to receive communications from a first communication device and 720 and send the communications to a second communication device 730 can include the system described herein.

In yet another embodiment of a system illustrated generally at 700 in FIG. 7, a second network server 740 can be provided, adapted to receive the communications from the first communication device 720 and transmit the communications to the second communications device 730, is provided.

Figure 8:
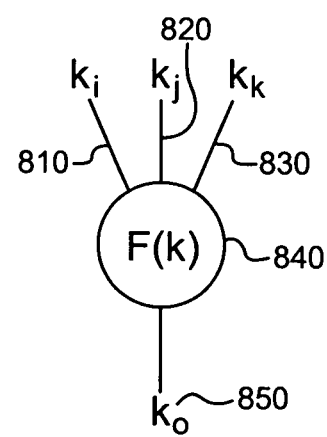
FIG. 8 illustrates an additional embodiment of a method constructed in accordance with the principles herein.

As illustrated in FIG. 8, although 2 input wires are commonly used, more input wires could be provided for each gate. For example, where the number of input wires exceeds 2, a key associated with each wire, such as, for example ki 810, kj 820 and kk 830 can be applied to a function f(k) 840 resulting in a single output key ko 850, such as, for example, an XOR function, or any other suitable function in order to achieve the result achieved with a two wire embodiment.

Figure 9:
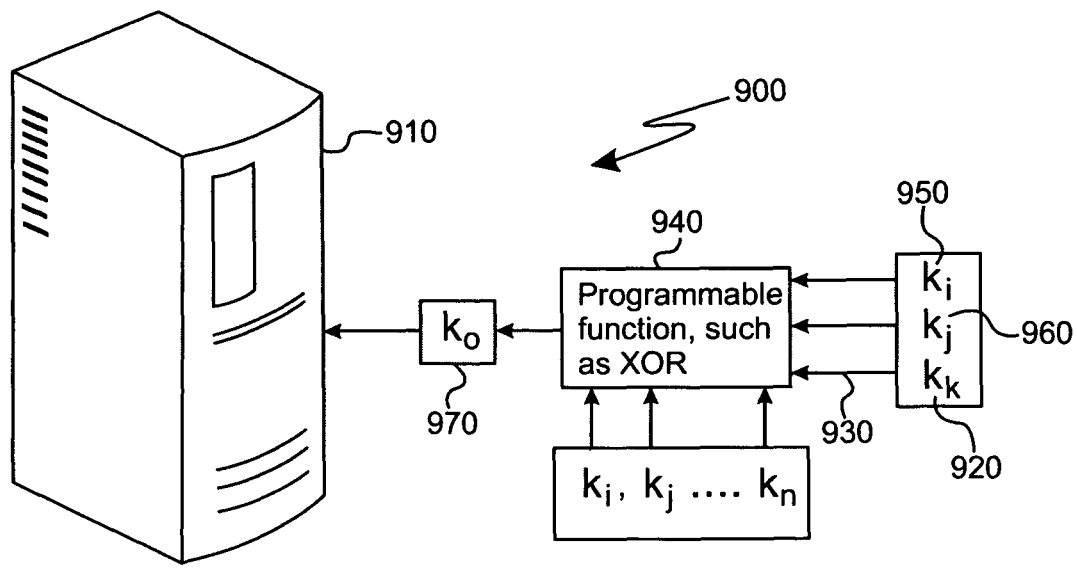
FIG. 9 illustrates still another embodiment of a method constructed in accordance with the principles herein.

For example, as illustrated in the exemplary system illustrated generally at 900 in FIG. 9, a network server 910 can include a third key kk 920 on a third garbled gate input wire 930. A programmable function 940 for combining a first key ki 950 and the second key kj 960 further combines the third key kk 920 with the first key ki 950 and the second key kj 960 to obtain a single encrypted output key ko 970.

Alternatively, the network server can further include an nth key kn on an nth garbled gate input wire. The programmable function for combining the first key ki and the second key kj can further combine the nth key kn with ki and kj to obtain an encrypted output key.

A suitable function to apply to the keys of n wires in accordance with the principles herein can include, for example, $_{[vk1]}$a bitwise cascade/mod 2 adder. Further, if the keys are, for example, 127 bits long, then they can be added together in accordance with the principles herein.

Figure 10:
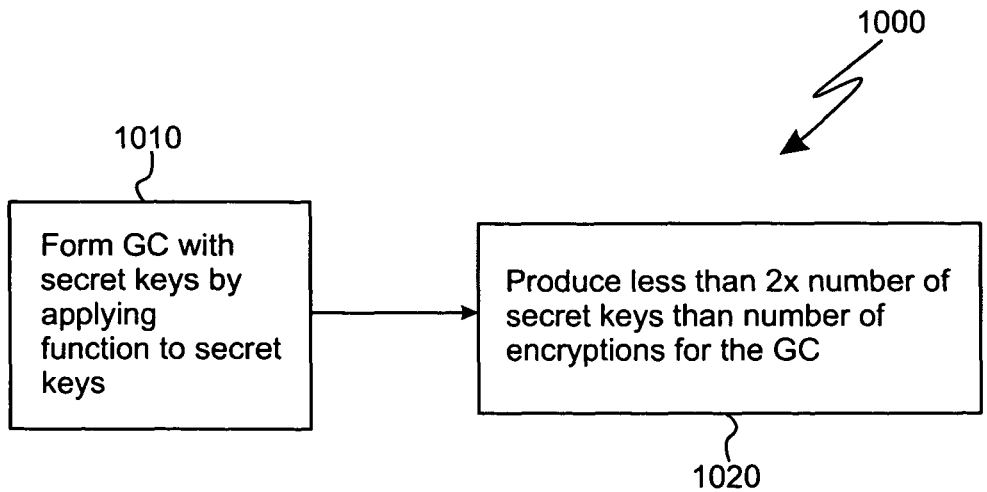
FIG. 10 illustrates another alternative embodiment of a method constructed in accordance with the principles herein.

As illustrated generally at 1000 in FIG. 10, a method for expediting encryption and decryption of a garbled circuit having a number of encryptions for a garbled table of a garbled gate can include the steps of forming the garbled table with a number of secret keys by applying a function to the secret keys to produce less than twice the number of secret keys as the number of encryptions for the garbled table, as illustrated, for example, at a first step 1010, and evaluating the garbled table to decrypt an output key of the garbled table at a second step 1020.

All of the embodiments set forth herein include principles achieved via a system and method adapted and constructed to operatively facilitate secure communication between communication devices, such as computers, cell phones, pda's, televisions, and the like. As such, each exemplary system or method herein contemplates the operative connection of signals to a communication, wireless, or other network over which encryptions are capable of being transmitted between communication devices.

The embodiments herein have been described and shown for purposes of illustration only, and are not to be construed as constituting any limitations of the present principles. Modifications will be obvious to those skilled in the art, and all modifications that do not depart from the spirit of the principles herein are intended to be included within the scope of the appended claims. Those skilled in the art will appreciate that the conception upon which this disclosure is based, may readily be utilized as a basis for the designing of other structures, methods and systems for carrying out the several purposes of the present principles.

With respect to the above description then, it is to be realized that the optimum dimensional relationships for the parts of any embodiment, including variations in size, materials, shape, form, function and manner of operation, assembly and use, and all equivalent relationships to those illustrated in the drawings and described in the specification, that would be deemed readily apparent and obvious to one skilled in the art, are intended to be encompassed by the present principles.

Therefore, the foregoing is considered as illustrative only of the principles herein. Further, since numerous modifications and changes will readily occur to those skilled in the art, it is not desired to limit the principles to the exact construction and operation shown and described, and accordingly, all suitable modifications and equivalents may be resorted to, falling within the scope of the principles described herein.

I claim:

1. An apparatus, comprising:
a first pair of input keys on a first garbled gate input wire;
a second pair of input keys on a second garbled gate input wire; and
a computer readable non-transitory medium having instructions located thereon which when executed by a processor:
receive a Pseudo-Random Function Generator (PRFG) circuit from a secure token configured to generate the PRFG circuit and to transmit the PRFG circuit from a first network device to a second network device, the PRFG circuit including a number of gate tables and wire encryptions, each gate for the number of garbled gates including a first key ki and a second key kj; and
implement the PRFG circuit, the PRFG circuit being configured to generate a random permutation of four garbled table entries, each garbled table entry being formed by a single encryption operation applied to a corresponding output key, each single encryption operation including encrypting each corresponding output key with a key formed from an exclusive OR function (XOR) of one of the four possible combinations of one key of the first pair of input keys and one key of the second pair of input keys,
wherein the encrypted output key for each garbled gate is selected from the domain of the PRFG circuit.

2. The apparatus according to claim 1, wherein the first and second keys are each 127 bits long, and wherein the programmable function adds the first and second keys.

3. The apparatus according to claim 1, wherein the PRFG is further defined by Advanced Encryption Standard (AES).

4. The apparatus according to claim 1, wherein the PRFG is further defined by Secure Hash Algorithm-256 (sha256).

5. An apparatus comprising:
a computer readable non-transitory memory;
a first input wire having a first pair of input keys;
a second input wire having a second pair of input keys; and
a garbled gate forming algorithm stored in the memory, wherein when executed by a processor the garbled gate forming algorithm receives a Pseudo-Random Function Generator (PRFG) circuit from a secure token, and generates from the PRFG circuit a random permutation of four garbled table entries, each garbled table entry being formed by a single encryption operation applied to a corresponding output key, each single encryption operation including encrypting each corresponding output key with a key formed from an exclusive OR function (XOR) of one of the four possible combinations of one key of the first pair of input keys and one key of the second pair of input keys,
wherein the secure token is configured to generate the PRFG circuit and to transmit the PRFG circuit from a first network device to a second network device, the PRFG circuit including a number of gate tables and wire encryptions, each gate for the number of garbled gates including a first key ki and a second key kj configured to generate the random permutation of four garbled table entries, each garbled table entry being formed by a single encryption operation applied to a corresponding output key, each single encryption operation including encrypting each corresponding output key with a key formed from an exclusive OR function (XOR) of one of the four possible combinations of one key of the first pair of input keys and one key of the second pair of input keys,
wherein the encrypted output key for each garbled gate is selected from the domain of the PRFG circuit.

6. The apparatus according to claim 5, wherein the gate forming algorithm further comprises Advanced Encryption Standard (AES).

7. The apparatus according to claim 5, wherein the PRFG circuit is transmitted via a secure token.

8. A method comprising the steps of:
providing a gate having first and second input wires, wherein the first wire has a first pair of input keys and wherein the second wire has a second pair of input keys;
generating a gate table using a secure token with a Pseudo-Random Function Generator (PRFG) circuit configured to generate a random permutation of four garbled table entries, each garbled table entry being formed by a single encryption operation applied to a corresponding output key, wherein the gate table includes four encryption operations, each single encryption operation including encrypting each corresponding output key with a key formed from an exclusive OR (XOR) function of one of the four possible combinations of one key of the first pair of input keys and one key of the second pair of input keys;
transmitting the PRFG circuit from a first network device to a second network device by the secure token, the PRFG circuit including a number of gate tables and wire encryptions, each gate for the number of garbled gates including a first key ki and a second key kj; and
selecting the encrypted output key for each garbled gate from the domain of the PRFG circuit.

9. The method according to claim 8, wherein the step of generating the gate table with a PRFG algorithm is further defined by generating the gate table using Advanced Encryption Standard (AES).

10. The method according to claim 8, wherein the step of generating the gate table with a PRFG algorithm is further defined by generating the gate table using Secure Hash Algorithm-256 (sha256).

11. An apparatus, comprising:
a network server adapted to receive communications from a first communication device and to send the communications to a second communication device comprising an encryption system for a garbled circuit, the garbled circuit including a number of garbled Boolean gates having first and second garbled Boolean gate input wires, comprising:
a first pair of input keys on a first garbled gate input wire;
a second pair of input keys on a second garbled gate input wire; and
a computer readable non-transitory medium having instructions located thereon which when executed by a processor implement:
a Pseudo-Random Function Generator (PRFG) circuit configured to generate a random permutation of four single encryption operations applied to a corresponding output key, each single encryption operation including encrypting each corresponding output key with a key formed from an exclusive OR function (XOR) of one of the four possible combinations of one key of the first pair of input keys and one key of the second pair of input keys,
wherein the garbled circuit is transmitted by a secure token, the garbled circuit including a number of gate tables and wire encryptions, each gate for the number of garbled gates including a first key ki and a second key kj,
wherein the token generates and transmits the circuit from a first network device to a second network device, and
wherein the encrypted output key for each garbled gate is selected from the domain of the garbled circuit.

12. The network server according to claim 11, further comprising a second network server adapted to receive the communications for the second communication device and transmit the communications to the second communications device.

13. The network server according to claim 11, further comprising:
a third key kk on a third garbled gate input wire,
wherein the programmable function configured to combine the first key ki and the second key kj further combines the third key kk with ki and kj to obtain an encrypted output key.

14. The network server according to claim 11, further comprising:
an nth key kn on an nth garbled gate input wire,
wherein the programmable function configured to combine the first key ki and the second key kj further combines the nth key kn with ki and kj to obtain an encrypted output key.

* * * * *